(12) United States Patent
Miller et al.

(10) Patent No.: US 10,060,362 B2
(45) Date of Patent: Aug. 28, 2018

(54) METHOD AND SYSTEM FOR ENGINE CONTROL

(71) Applicant: Ford Global Technologies, LLC, Dearborn, MI (US)

(72) Inventors: Kenneth James Miller, Canton, MI (US); Thomas G. Leone, Ypsilanti, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 15/146,784

(22) Filed: May 4, 2016

(65) Prior Publication Data
US 2017/0321616 A1 Nov. 9, 2017

(51) Int. Cl.
| F02D 19/06 | (2006.01) |
| F02D 35/02 | (2006.01) |
| B60W 20/00 | (2016.01) |
| F02D 41/00 | (2006.01) |
| F02D 19/08 | (2006.01) |

(52) U.S. Cl.
CPC .......... *F02D 19/0615* (2013.01); *B60W 20/00* (2013.01); *F02D 35/027* (2013.01); *F02D 41/0025* (2013.01); *F02D 19/084* (2013.01); *F02D 2200/0625* (2013.01); *F02D 2200/503* (2013.01); *Y02T 10/36* (2013.01)

(58) Field of Classification Search
CPC ............. F02D 19/0615; F02D 19/0613; F02D 19/0607; F02D 19/06; F02D 19/0626; F02D 19/08; F02D 19/081; F02D 35/027; F02D 41/0025
See application file for complete search history.

(56) References Cited

U.S. PATENT DOCUMENTS

| 3,254,620 A | 6/1966 | Cannon |
| 3,640,894 A | 2/1972 | Sampson et al. |
| 4,391,716 A | 7/1983 | McCurry |

(Continued)

FOREIGN PATENT DOCUMENTS

| CA | 2762747 A1 | 7/2012 |
| CN | 1223335 A | 7/1999 |

(Continued)

OTHER PUBLICATIONS

Hoffmann, W., et al., "A New Approach to Ethanol Utilization: High Efficiency and Low NOx in an Engine Operating on Simulated Reformed Ethanol," SAE Technical Paper 2008-01-2415, Powertrains, Fuels & Lubricants Meeting, Rosemont, IL, Oct. 6-9, 2008, 11 pages.

(Continued)

*Primary Examiner* — Jacob Amick
(74) *Attorney, Agent, or Firm* — Julia Voutyras; McCoy Russell LLP

(57) ABSTRACT

Methods and systems are provided for synergizing the benefits of a multi-fuel engine in a hybrid vehicle system. During engine operation, in response to a change in driver demand, the controller may opt to switch fuels or maintain a current fuel while using stored power assist. The selection may be based on the combination of fuel and stored power offset that provides the highest engine efficiency at the lowest fuel cost.

18 Claims, 5 Drawing Sheets

(56) References Cited

U.S. PATENT DOCUMENTS

| | | |
|---|---|---|
| 4,505,169 A | 3/1985 | Ganoung |
| 5,237,978 A | 8/1993 | Bailey |
| 5,408,874 A | 4/1995 | Fleck, Sr. et al. |
| 5,785,136 A | 7/1998 | Falkenmayer et al. |
| 5,806,617 A | 9/1998 | Yamaguchi |
| 6,116,363 A | 9/2000 | Frank |
| 6,276,473 B1 | 8/2001 | Zur Megede |
| 6,378,637 B1 | 4/2002 | Ono et al. |
| 6,450,193 B1 | 9/2002 | Constantinou |
| 6,655,324 B2 | 12/2003 | Cohn et al. |
| 6,715,452 B1 | 4/2004 | Taylor, III et al. |
| 6,715,453 B2 | 4/2004 | Tomatsuri et al. |
| 6,796,287 B2 | 9/2004 | Mogi et al. |
| 6,915,766 B2 | 7/2005 | Aoyama et al. |
| 6,929,582 B2 | 8/2005 | Yang et al. |
| 6,970,781 B1 | 11/2005 | Chen et al. |
| 7,213,397 B2 | 5/2007 | Hu et al. |
| 7,258,099 B2 | 8/2007 | Yoshida et al. |
| 7,267,087 B2 | 9/2007 | Glugla |
| 7,295,902 B2 | 11/2007 | Chen et al. |
| 7,426,907 B2 | 9/2008 | Dearth et al. |
| 7,703,435 B2 | 4/2010 | Surnilla et al. |
| 7,676,321 B2 | 5/2010 | Andri |
| 7,748,481 B2 | 7/2010 | Holmes et al. |
| 7,805,238 B2 | 9/2010 | Andri |
| 7,826,957 B2 | 11/2010 | Fabien |
| 7,832,511 B2 | 11/2010 | Syed et al. |
| 7,845,315 B2 | 12/2010 | Leone et al. |
| 7,925,418 B2 | 4/2011 | Fabien |
| 8,015,951 B2 | 9/2011 | Dearth et al. |
| 8,050,831 B2 | 11/2011 | Martin et al. |
| 8,065,979 B2 | 11/2011 | Leone et al. |
| 8,118,009 B2 | 2/2012 | Pursifull et al. |
| 8,127,745 B2 | 3/2012 | Surnilla et al. |
| 8,141,356 B2 | 3/2012 | Leone et al. |
| 8,312,867 B2 | 11/2012 | Pursifull et al. |
| 8,375,899 B2 | 2/2013 | Leone et al. |
| 8,387,591 B2 | 3/2013 | Surnilla et al. |
| 8,539,914 B2 | 9/2013 | Kerns et al. |
| 8,550,058 B2 | 10/2013 | Pursifull et al. |
| 8,606,474 B2 | 12/2013 | Guo et al. |
| 8,656,869 B2 | 2/2014 | Leone et al. |
| 8,701,630 B2 | 4/2014 | Surnilla et al. |
| 8,738,255 B2 | 5/2014 | Carter et al. |
| 8,746,189 B2 | 6/2014 | Kawasaki |
| 9,038,613 B2 | 5/2015 | Pursifull et al. |
| 9,157,385 B2 | 10/2015 | Gallagher et al. |
| 9,376,967 B2 | 6/2016 | Springer et al. |
| 2004/0188154 A1 | 9/2004 | Carlson |
| 2009/0271090 A1* | 10/2009 | Surnilla ............. F02D 19/0628 701/103 |
| 2010/0063658 A1 | 3/2010 | Martin et al. |
| 2011/0029177 A1 | 2/2011 | Yeung et al. |
| 2011/0246010 A1 | 10/2011 | de la Torre Bueno |
| 2013/0055990 A1 | 3/2013 | Kamada |
| 2014/0067540 A1 | 3/2014 | Williams et al. |
| 2014/0116395 A1 | 5/2014 | Blackstock |
| 2014/0202430 A1 | 7/2014 | Monros |
| 2015/0006000 A1* | 1/2015 | Kawata ................... B60K 6/48 701/22 |
| 2015/0114359 A1 | 4/2015 | Leone et al. |
| 2015/0300830 A1 | 10/2015 | Fisher |

FOREIGN PATENT DOCUMENTS

| | | |
|---|---|---|
| CN | 103291468 A | 9/2013 |
| CN | 104005861 A | 8/2014 |
| CN | 203756344 U | 8/2014 |
| JP | 407019124 A | 1/1995 |
| JP | 2006257907 A | 9/2006 |
| JP | 2007077918 A | 3/2007 |
| SU | 0731020 | 4/1980 |
| SU | 0848725 | 7/1981 |
| WO | 2007027327 A2 | 3/2007 |

OTHER PUBLICATIONS

Kadota, M. et al., "Advanced Control System of Variable Compression Ratio (VCR) Engine with Dual Piston Mechanism," SAE International 2009-01-1063, Apr. 20, 2009, 10 pages.

Wheeler, Jennifer C. et al., "High Efficiency, Low Feedgas NOx, and Improved Cold Start Enabled by Low Temperature Ethanol Reforming," SAE International 2010-01-0621, Apr. 12, 2010, 18 pages.

Wheeler, Jennifer C. et al., "Low-Temperature Ethanol Reforming: A Multi-Cylinder Engine Demonstration," SAE International 2011-01-0142, Apr. 12, 2011, 20 pages.

Kleeberg, Henning et al., "Increasing Efficiency in Gasoline Powertrains with a Two-Stage Variable Compression Ratio (VCR) System," SAE International 2013-01-0288, Apr. 8, 2013, 10 pages.

Morgenstern, David et al., "Integration of an E85 Reforming System into a Vehicle-Ready Package and Project Results," SAE International 2014-01-1191, Apr. 1, 2014, 12 pages.

Ferrey, Paul et al., "Potential of a Variable Compression Ratio Gasoline SI Engine with Very High Expansion Ratio and Variable Valve Actuation," SAE International 2014-01-1201, Apr. 1, 2014, 20 pages.

Glugla, Chris Paul, "Method and System for Pre-Ignition Control," U.S. Appl. No. 14/604,279, filed Jan. 23, 2015, 54 pages.

Glugla, Chris Paul, "Method and System for Engine Control," U.S. Appl. No. 14/923,900, filed Oct. 27, 2015, 41 pages.

Miller, Kenneth James et al., "Method and System for Engine Control," U.S. Appl. No. 15/146,687, filed May 4, 2016, 54 pages.

Leone, Thomas G. et al., "Method and System for Engine Control," U.S. Appl. No. 15/146,720, filed May 4, 2016, 62 pages.

Leone, Thomas G. et al., "Method and System for Hybrid Vehicle Control," U.S. Appl. No. 15/146,752, filed May 4, 2016, 46 pages.

Miller, Kenneth James et al., "Method and System for Engine Control," U.S. Appl. No. 15/146,809, filed May 4, 2016, 52 pages.

Miller, Kenneth James et al., "Method and System for Engine Control," U.S. Appl. No. 15/146,822, filed May 4, 2016, 47 pages.

* cited by examiner

METHOD AND SYSTEM FOR ENGINE CONTROL

FIELD

The present description relates generally to methods and systems for controlling fuel usage of an engine in a hybrid vehicle system.

BACKGROUND/SUMMARY

Engines may operate using a plurality of different fuels, which may be separately delivered, or delivered in varying ratios, depending on operating conditions. The different fuels may have differing efficiencies at a given operating condition. For example, an engine may use a first fuel (e.g., ethanol) and a second fuel (e.g., gasoline), each with different knock suppression abilities, to reduce engine knock limitations while improving overall fuel economy. As such, there may be several reasons why different fuels available to the engine may have different efficiencies at various engine running conditions. As one example, the available fuels may have different octane ratings which affects spark retard usage and engine efficiency at high loads (for example, when the different fuels are compressed natural gas versus gasoline, or E85 versus gasoline, or regular quality fuel versus premium quality fuel). As another example, different fuels may have different pumping work (for example, when the different fuels include a gaseous fuel versus a liquid fuel, or a port injected fuel versus a direct injected fuel). As still another example, different fuels may have different parasitic losses (such as when the fuels include a fuel delivered via high pressure direct injection versus a fuel delivered via low pressure port injection).

Engine control systems may select a fuel for injecting into cylinders from the multiple available fuels based on engine operating conditions, fuel availability, as well as fuel costs. One example approach is shown by Surnilla et al. in U.S. Pat. No. 7,703,435. Therein, fuel selection is based on fuel availability, engine temperature, and knock limits. Another example approach is shown by Williams et al. in US20140067540. Therein fuel selection is based on fuel costs in a geographical area of interest.

However the inventors herein have recognized potential issues with such approaches. As one example, there may be constraints and trade-offs associated with the fuel selection, such as reduced efficiency, torque, or power when a particular fuel is selected for cost reasons. Another issue is that frequent changes in operator pedal demand, as well frequent pedal demand overshoot may cause the engine load to move back and forth, leading to frequent switching between the fuels. Excessive fuel switches can degrade fuel economy due to losses incurred during transitions. In addition, the frequent switching can result in speed/load and air/fuel ratio disturbances. The issue may be exacerbated in a hybrid vehicle where the engine encounters multiple engine pull-ups and pull-downs (such as during frequent start/stop events).

The inventors herein have recognized that the operating cost of a hybrid powertrain having a multi-fuel engine may be reduced (e.g., minimized) by determining a minimum cost of vehicle operation at the most efficient speed/load for each fuel at the driver demanded power, while compensating with battery power, and additionally while smoothing torque transients using motor torque. In particular, battery power can be leveraged to reduce the frequency of fuel switching while also improving the cost of operating with a given fuel, without being hindered by associated constraints and trade-offs. In one example, fuel economy may be improved by a method for a hybrid vehicle system comprising: propelling the vehicle via an engine combusting a first fuel and a second fuel selected based on driver demand; and in response to a change in driver demand, adjusting relative usage of the first fuel and the second fuel based on each of the change in driver demand and a battery state of charge. For example, a controller may select between maintaining usage of the first fuel or transitioning to the second fuel. As a result, frequent fuel switching and associated losses can be reduced.

As an example, a hybrid vehicle system may be configured with a battery powered electric motor for propelling vehicle wheels via motor torque, as well as a bi-fuel engine wherein one of two fuels is used for propelling vehicle wheels via engine torque. The two fuels may have different octane ratings and may be delivered to the engine via distinct delivery systems. As one example, the two fuels may include a higher octane ethanol fuel that is delivered to an engine cylinder via direct injection and a lower octane gasoline fuel that is delivered to the engine cylinder via port injection. At any given driver demand, the controller may be configured to compare the fuel efficiency versus power for each available fuel, including a fuel the engine is currently operating on as well as an alternate available fuel. Upon retrieving a cost of each fuel (such as from the cloud), the efficiency may be divided by the cost to determine a "work per dollar" value for each fuel. The controller may then recalculate the efficiency of each fuel with a range of battery offsets. The battery offsets may be determined based on the state of charge of the system battery and may include a positive offset (wherein battery power via battery discharging is used to boost engine output) as well as a negative offset (wherein battery power via battery charging is used to adjust engine output). Assuming an average cycle efficiency for battery power generated from the engine, the controller may calculate the "battery work per dollar" values for each fuel. The controller may then select whether to continue using the current fuel (with or without battery offset) or transition to using the other fuel (with or without battery offset) by comparing the costs. Specifically, if a higher than threshold improvement in efficiency and cost is achieved by transitioning to the other fuel, the transition may be performed, else usage of the current fuel may be maintained. Any transients incurred during the transition may be smoothened using motor torque. Also following the fuel selection, the controller may use motor torque adjustments to operate the engine in a narrow speed-load operating range where efficiency of the selected fuel is optimized, while maintaining a given power level of the vehicle.

In this way, fuel economy losses in a vehicle system can be reduced. One of the technical effects of using battery power to extend operation of a multi-fuel engine with a given fuel in a hybrid vehicle is that losses associated with frequent fuel switching are reduced. In particular, battery power can be used to keep operating the engine on a current fuel at a more efficient power. While operating the engine with the more efficient and cost-effective fuel, battery power can be used up to a threshold to make up any difference in output, the threshold based on an associated cost penalty. The technical effect of using battery power to meet driver demand while maintaining a cost-effective and efficient fuel usage in a multi-fuel engine during selected engine operating conditions is that fuel switching can be reduced. In addition, engine operation in a more efficient and cost-effective fuel regime can be extended despite changes in driver or wheel torque demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
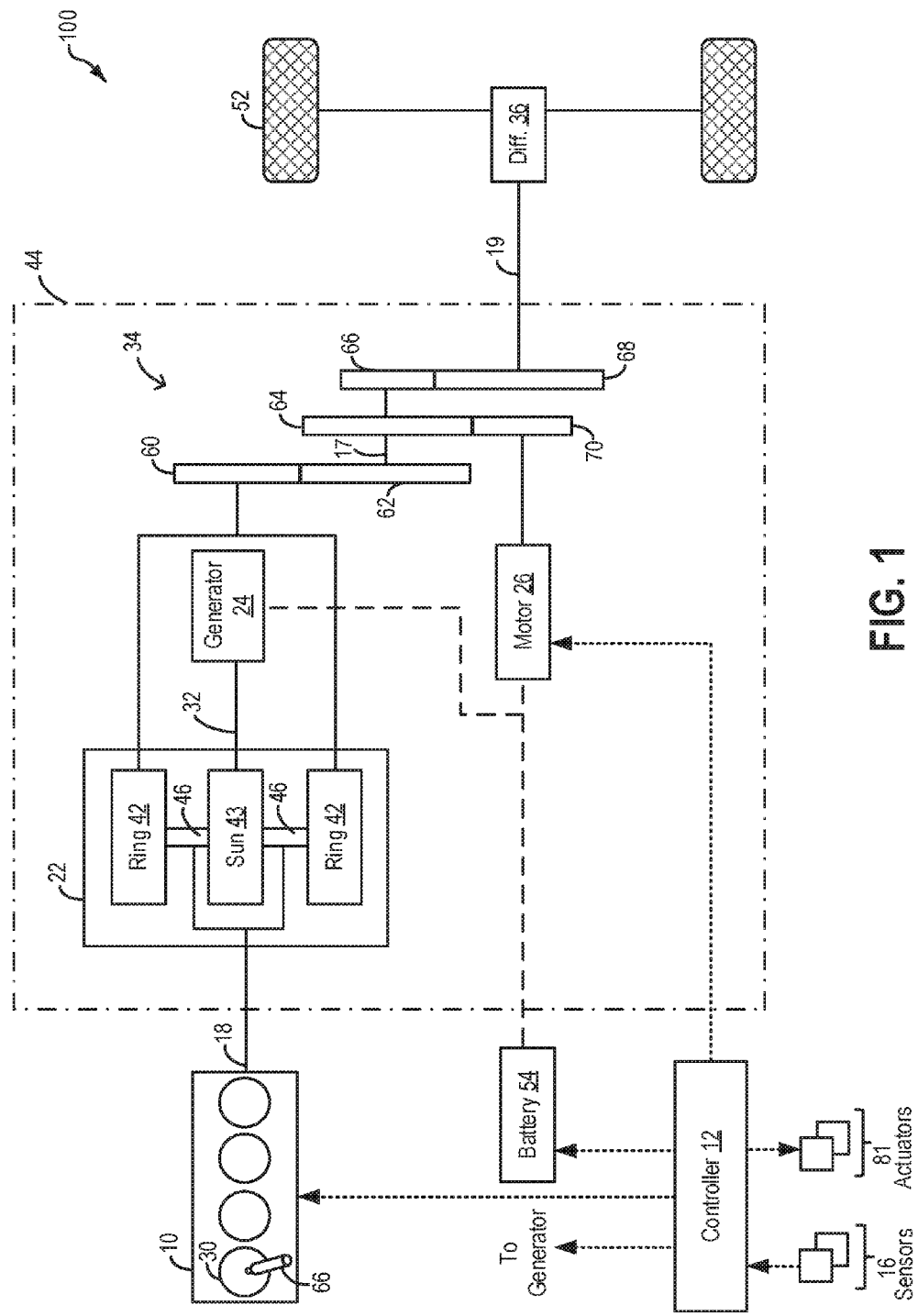
FIG. 1 illustrates an example propulsion system for a hybrid electric vehicle.

The following description relates to systems and methods for improving fuel economy in a hybrid vehicle system, such as the vehicle system of FIG. 1. The vehicle system may include a multi-fuel engine configured to be operated with at least one of two available fuels, as described with reference to the engine system of FIG. 2. A controller may be configured to perform a control routine, such as the example routine of FIG. 3, to choose between transitioning to an alternate fuel and maintaining usage of a current fuel while meeting any demand deficit using battery power and motor torque. The selection may enable the more efficient and cost-effective fuel to be used for the given power level. An example map that may be used by the controller to select a fuel is shown with reference to FIG. 4. An example hybrid vehicle operation with fuel usage adjustments is shown at FIG. 5. In this way, bi-fuel (or multi-fuel) technology can be synergized with hybrid vehicle technology to achieve significant fuel economy improvements.

FIG. 1 depicts a hybrid propulsion system 100 for a vehicle. In the depicted embodiment, the vehicle is a hybrid electric vehicle (HEV), but alternate embodiments could include hybrid vehicles using hydraulic, pneumatic, flywheel, or other energy storage systems and motors. Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 66. A detailed embodiment of the engine is provided with reference to FIG. 2.

Engine 10 delivers power to transmission 44 via torque input shaft 18. In the depicted example, transmission 44 is a power-split transmission (or transaxle) that includes a planetary gear set 22 and one or more rotating gear elements. Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by the electric motor. However, in alternate embodiments, the inverter may be configured in the electric motor. Due to the mechanical properties of the planetary gear set, generator 24 may be driven by a power output element (on an output side) of the planetary gear set 22 via mechanical connection 32, as further elaborated below.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode). For example, during conditions when the engine torque output is higher than the driver demand, the torque difference may be absorbed at the motor and used to charge the battery, thereby smoothing out the torque transient.

Planetary gear set 22 comprises a ring gear 42, a sun gear 43, and a planetary carrier assembly 46. The ring gear and sun gear may be coupled to each other via the carrier. A first input side of planetary gear set 22 is coupled to engine 10 while a second input side of the planetary gear set 22 is coupled to the generator 24. An output side of the planetary gear set is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. Accordingly, hybrid propulsion system 100 may be operated in various modes of operation.

For example, the vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 52 (the generator may also be providing torque to wheels if in motoring mode). During the "engine" mode, fuel may be supplied to engine 10 from a fuel tank via fuel injector 66 so that the engine can spin fueled to provide the torque for propelling the vehicle. Specifically, engine power is delivered to the ring gear of the planetary gear set.

Coincidentally, the generator provides torque to the sun gear 43, producing a reaction torque to the engine. Consequently, torque is output by the planetary carrier to gears 62, 64, 66 on countershaft 17, which in turn delivers the power to wheels 52. Optionally, the engine can be operated to output more torque than is needed for propulsion, in which case the additional power is absorbed by the generator (in generating mode) to charge the battery 54 or supply electrical power for other vehicle loads. In this mode, only engine torque is used to propel the vehicle wheels.

In another example, the vehicle may be driven in a second engine-on mode, herein also referred to as an "assist" mode. During the assist mode, engine 10 is operated and used as the primary source of torque for powering wheels 52 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels. In this mode, each of engine torque and motor torque is used to propel the vehicle wheels.

In still another example, the vehicle may be driven in an engine-off mode, herein also referred to as an electric mode, wherein battery-powered electric motor 26 is operated and used as the only source of torque for driving wheels 52. As such, during the engine-off mode, no fuel may be injected into engine 10 irrespective of whether the engine is spinning or not. The "engine-off" mode may be employed, for example, when cruising at steady vehicle speed, during braking, light acceleration at low speeds, while stopped at traffic lights, etc. Specifically, motor power is delivered to gear element 70, which in turn drives the gear elements on countershaft 17, and thereon drives wheels 52. In this mode, only motor torque is used to propel the vehicle wheels.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, and other sensors such as those described with reference to FIG. 2. The various actuators may include, for example, the transmission gear set, cylinder fuel injectors, an air intake throttle coupled to the engine intake manifold, and other actuators such as those described with reference to FIG. 2. Controller 12 may receive input data from the various sensors, process the input data, and trigger the actuators in response to the processed input data based on instruction or code programmed therein corresponding to one or more routines. Example control routines are described herein with regard to FIG. 3.

Figure 2:
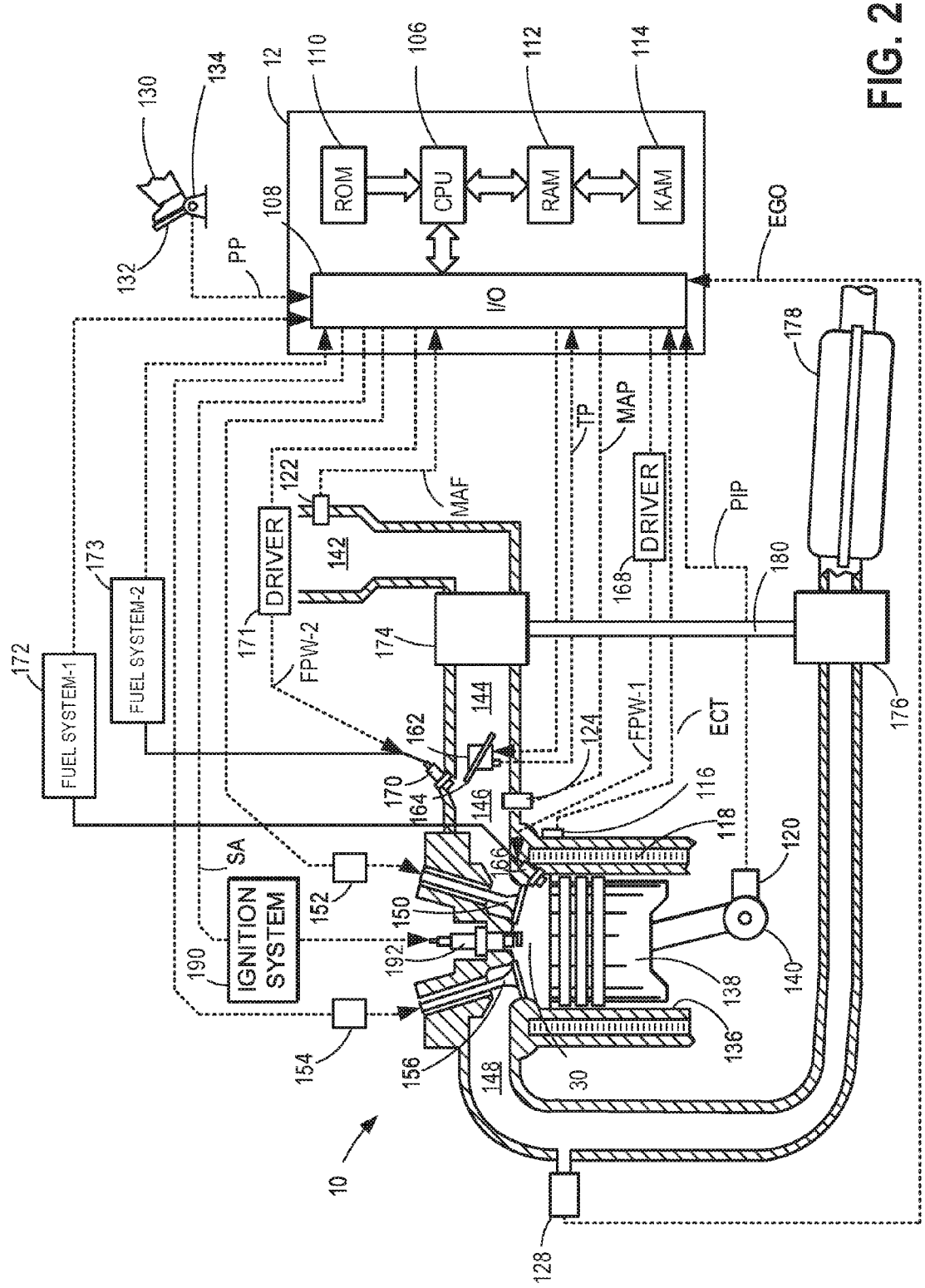
FIG. 2 shows a partial engine view.

FIG. 2 depicts an example embodiment of a combustion chamber or cylinder of internal combustion engine 10. In one example, engine 10 may be coupled in a propulsion system (such as an on-road vehicle), such as the hybrid vehicle system of FIG. 1.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including two fuel injectors 166 and 170. Fuel injector 166 is shown coupled directly to cylinder 30 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the low volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 30, in a configuration that provides what is known as port injection of fuel (hereafter referred to as "PFI") into the intake port upstream of cylinder 30. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Engine 10 may be configured as a multi-fuel engine (bi-fuel engine in the depicted example) where the engine may be operated using one or more of the available fuels. Fuel tanks in fuel systems 172 and 173 may hold fuel with different fuel qualities, such as different fuel compositions. These differences may include different alcohol content, different octane, different heats of vaporization, different fuel blends, different fuel volatilities, and/or combinations thereof etc. One example of fuels with different alcohol contents includes gasoline as a first fuel with a lower alcohol content and an ethanol fuel blend (such as E85) as a second fuel with a greater alcohol content. In another example, the engine may use ethanol fuel blends of varying alcohol content as the first and second fuel, such as Eli) (which is approximately 10% ethanol and 90% gasoline) as the first fuel that is port injected and E85 (which is approximately 85% ethanol and 15% gasoline) as a second fuel that is direct injected. Other feasible substances include water, a mixture of alcohol and water, a mixture of alcohols etc. In alternate examples, the available fuels may vary in octane rating, composition, etc. As another example, fuels with different volatility include fuel of different alcohol content, or fuels of different seasonal or regional grades (e.g., a winter grade fuel and a summer grade fuel, or a northern grade fuel and a southern grade fuel). Additionally, the first and second fuels may also differ in other fuel qualities such as a difference in temperature, viscosity, octane number, etc. In still other examples, the different fuels may include a gaseous fuel (such as compressed natural gas which is stored as a liquid fuel but available as a gaseous fuel in the cylinder) and a liquid fuel (such as gasoline which is stored and available in the cylinder as a liquid fuel).

In the depicted embodiment, engine 10 is a multi-fuel engine system such that the fuel stored in fuel system-1 172 and delivered by fuel injector 166 is different from the fuel stored in fuel system-2 173 and delivered by fuel injector 170. As a non-limiting example, the first fuel delivered by port injection may be a first fuel having a lower alcohol content, while the second fuel delivered by direct injection may be a second fuel having a higher alcohol content. As elaborated below, the engine controller may adjust fuel injection profiles during an engine start, crank, and idle speed control to leverage the fuel properties of the different fuels available in the fuel system, as well as the benefits of port and direct injection to reduce exhaust gaseous and PM emissions.

Fuel may be delivered by both injectors to the cylinder during a single cycle of the cylinder. For example, each injector may deliver a portion of a total fuel injection that is combusted in cylinder 30. Further, the distribution and/or relative amount of fuel delivered from each injector may vary with operating conditions, such as engine speed, load, exhaust temperature, PM emissions, etc. The relative distribution of the total amount of first fuel port injected by injector 170 and the total amount of second fuel direct injected (as one or more injections) by direct injector 166 may be referred to as a first injection ratio. For example, injecting a larger amount of the first fuel for a combustion event via (port) injector 170 may be an example of a higher first ratio of port to direct injection, while injecting a larger amount of the second fuel for a combustion event via (direct) injector 166 may be a lower first ratio of port to direct injection. Note that these are merely examples of different injection ratios, and various other injection ratios may be used.

Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the intake stroke, multiple injections during the compression stroke, or a combination of some direct injections during the intake stroke and some during the compression stroke. When multiple direct injections are performed, the relative distribution of the total amount of second fuel directed injected between an intake stroke (direct) injection and a compression stroke (direct) injection may be referred to as a second injection ratio. For example, direct injecting a larger amount of the second fuel for a combustion event during an intake stroke may be an example of a higher second ratio of intake stroke direct injection, while injecting a larger amount of the second fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the intake stroke, compression stroke, or any appropriate combination thereof.

Figure 3:
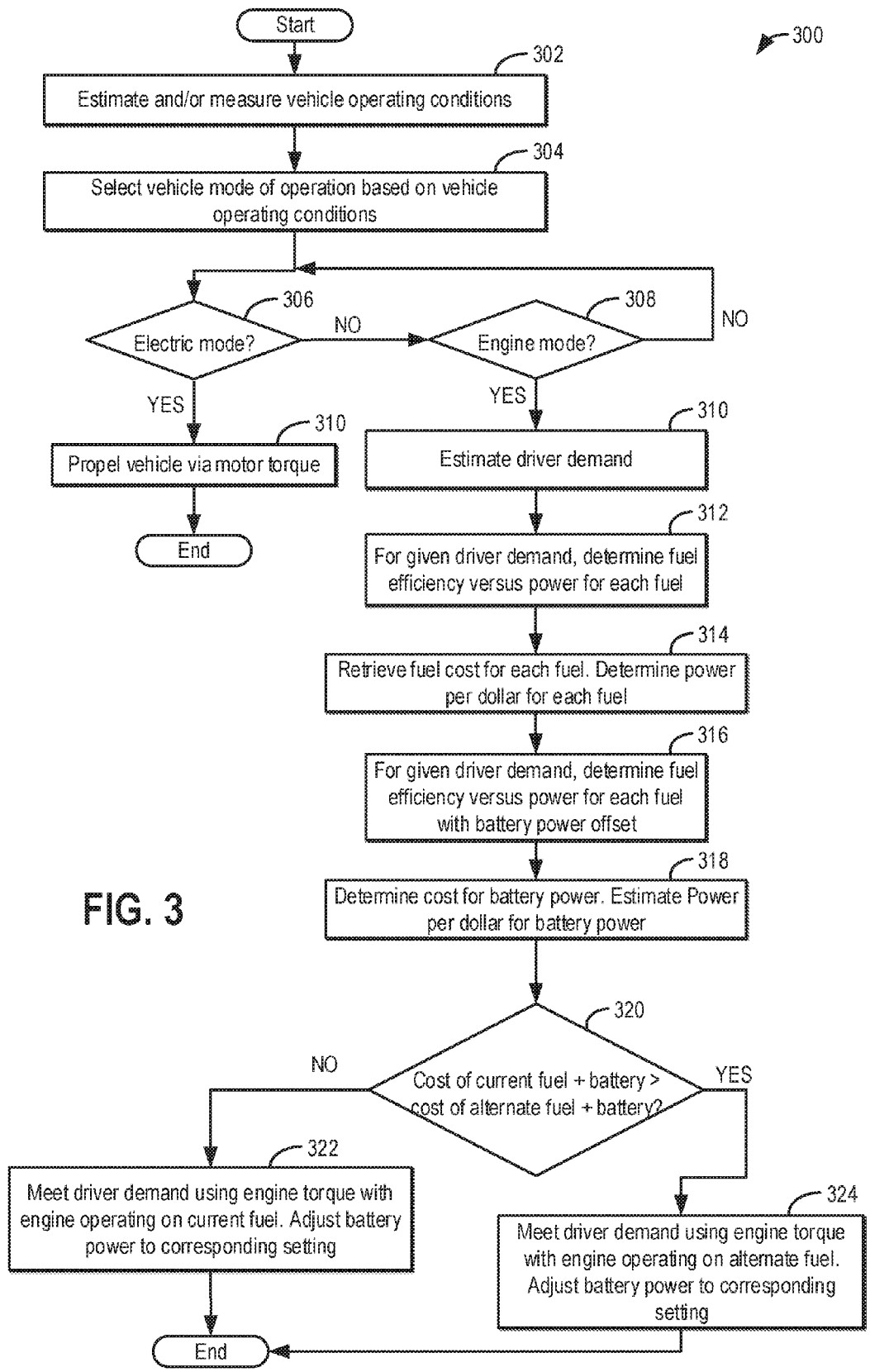
FIG. 3 shows a high level flow chart for adjusting fuel selection responsive to a driver demand in a hybrid electric vehicle by leveraging battery power.

As elaborated with reference to FIG. 3, the controller may select a fuel for combustion in the cylinder responsive to a driver demand based on the efficiency of the fuel at the requested power level as well as the cost effectiveness of the fuel. In addition, the selection may take into account that power from an energy storage system of the hybrid vehicle, such as battery power, can be leveraged to operate the engine in an operating region optimized for a given fuel while maintaining the power level using battery power. By comparing the cost penalties and selecting a fuel in accordance, use of a fuel in an efficient region can be extended despite frequent changes in driver demand. By reducing frequent fuel switching without compromising fuel economy and fuel costs, losses and issues associated with fuel switching can be reduced.

As described above, FIG. 1 shows only one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. The controller 12 receives signals from the various sensors of FIGS. 1-2 and employs the various actuators of FIGS. 1-2 to adjust vehicle and engine operation based on the received signals and instructions stored on a memory of the controller. For example, adjusting fuel usage may include activating a fuel injector coupled to a fuel tank housing a selected fuel while deactivating a fuel injector coupled to a fuel tank housing a remaining fuel. An example routine that may be performed by the controller is described at FIG. 3.

In this way, the system of FIGS. 1-2 enables a hybrid vehicle system comprising: a motor powered via an energy storage system; an internal combustion engine including a cylinder; a first fuel injector for injecting a first fuel into the cylinder; a second fuel injector for injecting a second fuel into the cylinder; vehicle wheels propelled via one or more of motor torque and engine torque; a pedal position sensor for receiving an operator torque demand; and a controller. The controller may be configured with computer-readable instructions stored on non-transitory memory for: responsive to a first change in operator torque demand, maintaining injection of the first fuel while changing a state of charge of the energy storage system by a first amount to meet the torque demand; and responsive to a second, different change in operator torque demand, shifting to injection of the second fuel while changing the state of charge of the energy storage system by a second, different amount to meet the torque demand. Herein, the first change in operator torque demand may be a decrease in demand wherein changing the state of charge of the energy storage system by a first amount includes charging the energy storage system. The second change in operator torque demand may be an increase in demand wherein changing the state of charge of the energy storage system by a second amount includes discharging the energy storage system. The controller may include further instructions for: while maintaining injection of the first fuel, operating the engine in a first engine speed-load profile while maintaining a power level; and while shifting to injection of the second fuel, operating the engine in a second engine speed-load profile while maintaining the power level.

It will be appreciated that while the examples disclosed herein are discussed with relation to a hybrid electric vehicle having an electrically actuated motor, this is not meant to be limiting, and the same approach may be applied to other hybrid vehicle systems such as those including a flywheel, hydraulic, and/or pneumatic motor. Likewise, any energy storage system may be used for providing motor torque, including but not limited to a system battery.

Now turning to FIG. 3, an example routine 300 is described for coordinating adjustments to selection of fuel in a bi-fuel engine with motor operation in a hybrid vehicle system. The method enables motor torque adjustments to be leveraged to extend engine operation with a cost-effective and efficient fuel despite changes in driver torque demand. Instructions for carrying out method 300 as well the other methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below. For example, the controller may adjust the activation and pulse-width of a fuel injector delivering a selected fuel.

At 302, the routine includes estimating and/or measuring vehicle operating conditions. These may include, for example, driver torque demand (such as based on output of a pedal position sensor coupled to an operator pedal), ambient temperature, pressure and humidity, engine temperature, battery state of charge, fuel level in each fuel tank, octane rating of available fuels, etc. In addition, engine operating conditions such as manifold pressure (MAP), manifold air flow (MAF), engine temperature, catalyst temperature, intake temperature, knock limits, etc., may be estimated.

At 304, the method includes determining a vehicle mode of operation based on the estimated vehicle operating conditions. This includes shifting between propelling the vehicle motor torque and engine torque responsive to the engine operating conditions, including the driver demand. For example, an electric mode of operation may be selected when the torque demand is lower, when the fuel level in the fuel tank(s) is lower, and/or when the battery state of charge is higher. In the electric mode, the vehicle wheels may be propelled only via motor torque from an electric motor that is powered by a system battery. As another example, an engine mode of operation may be selected when the torque demand is higher, when the fuel level in the fuel tank(s) is higher, and/or when the battery state of charge is lower. In the engine mode, the vehicle wheels may be propelled only via engine torque from an engine. Further still, an assist mode may be selected if the torque is higher than a level that can be provided via only engine torque. Therein, the vehicle wheels may be propelled via each of motor torque and engine torque.

At 306, it may be confirmed if the electric mode was selected. If yes, then at 310, the method includes propelling the vehicle via motor torque. If an electric mode is not confirmed, at 308, it may be confirmed if the engine mode was selected. If yes, then at 310, the method includes estimating the driver demand. In one example, the driver torque demand may be inferred from an operator pedal position, such as an accelerator pedal position. As elaborated herein, the hybrid vehicle may be propelled via engine combusting a first fuel based on driver demand, and in response to a change in driver demand, the controller may select between maintaining usage of the first fuel or transitioning to a second, different fuel based on each of the change in driver demand and a battery state of charge. The selecting may be further based on a cost of usage of the first relative to a cost of usage of the second fuel.

Specifically, at 312, the method includes, for the given driver demand, determining the fuel efficiency versus power (engine speed and load) for each available fuel, such as for a first fuel and a second fuel in a bi-fuel engine. This includes the effects of differences in fuel octane, pumping work, and parasitic losses. For example, the controller may compare the efficiency of the engine for each fuel based on differences in octane, such that a higher-octane fuel offers improved efficiency at high torques where high-octane fuel enables reduced spark retard, but the efficiency with the two fuels may be equal at low torques where spark retard is not needed to avoid knock. Similarly, the controller may compare the efficiency of the engine for each fuel based on differences in pumping work, such that a gaseous fuel offers significantly improved efficiency at low torques where pumping work strongly affects efficiency, but the efficiency with the two fuels may be almost equal at high torques where there is little pumping work. Also the controller may compare the efficiency of the engine for each fuel based on differences in parasitic losses of each fuel delivery system, such that a gaseous or low-pressure port-injected fuel offers improved efficiency compared to high-pressure direct-injected fuel at low torques where fuel system parasitic losses strongly affect efficiency, but the efficiency with the two fuels may be almost equal at high torques where fuel system parasitic losses have a very small effect on efficiency. The combination of fuel octane, pumping work, and parasitic losses affect the efficiency of each fuel differently at each engine speed/load. For a given fuel, different combinations of speed and load can be considered to achieve a desired power output, and an optimum speed/load can be determined for that fuel at that power output. Iterating this process for different desired power levels allows determination of an optimum engine efficiency versus power for that fuel, and this information can be stored in the controller for each fuel. In practice, this information may be stored for different usage ratios of the two fuels, to enable optimized operation with a blend of the two fuels rather than forcing a distinct switch between fuels. For example, at very high loads the optimum efficiency may only be achieved with 100% high-octane fuel and at very low load the optimum efficiency may be achieved with 100% low-octane fuel, but in between the optimum efficiency may be achieved by varying the relative amounts of the two fuels, as described in U.S. Pat. Nos. 7,730,872 and 8,127,745.

At 314, the method includes retrieving the fuel costs for each fuel. In one example, the fuel cost may be retrieved from a cloud server or an off-board server or a fuel dispensing station when the vehicle controller is configured with wireless communication. In another example, fuel costs may be stored in a look-up table in the controller's memory, the fuel costs stored as a function of geographical location, or may be entered by the vehicle driver. Also at 314, upon retrieving the fuel cost, for each fuel, the controller may divide the efficiency by the fuel cost to get a power per dollar assessment for each fuel. In one example, the controller may use the following equation:

PowerPerDollar=fuel efficiency (in kW/gram/hr)*conversion constant/Fuel cost (in $/gallon).

In one example, a first fuel may cost more and a second fuel may cost less. Further, the efficiency of the first fuel may be higher such that a smaller amount of the first fuel is required to provide the same power as a larger amount of the second fuel. Herein if the effective (net) cost of using the smaller amount of more costly fuel is smaller than the effective cost of using the larger amount of less costly fuel, the PowerPerDollar value of the first fuel may be higher than that for the second fuel. Else if the effective (net) cost of using the smaller amount of more costly fuel is larger than the effective cost of using the larger amount of less costly fuel, the PowerPerDollar value of the second fuel may be higher than that for the first fuel.

At 316, the method includes, for the given driver demand, determining the fuel efficiency versus power for each fuel with a battery power offset. As such, various battery power offsets may be assessed, the battery power offset range selected based on a current battery state of charge (indicative of an amount of battery power that can be provided as well as an amount of charge that can be taken up by the battery). The battery power offsets may include one of an increase in the battery state of charge via charging of the battery using engine power, and decrease in the battery state of charging via discharging of the battery to supplement the engine power. For example, the controller may repeat the efficiency calculation assuming 5, 10, −5, and −10 kW battery offsets to the engine. Herein, 5 and 10 kW (positive) offsets imply battery power being used to boost engine power, with the battery being discharged to operate the engine in a more efficient operating region. In comparison, −5, −10 kW (negative) offsets imply battery power being drawn from engine power, with the battery being charged via the engine power to operate the engine in a more efficient operating region. In one example, the battery power offset applied with the usage of the first fuel may be different from the battery power offset applied with usage of the second fuel. In other examples, the offsets may be same.

The controller may select between maintaining using of a current fuel and transitioning to an alternate available fuel based on a cost of delivering the desired net power with each of the first and second fuel with a battery offset, the offset based on the battery state of charge. At 318, the method includes retrieving an estimated cost for the battery power (associated with the battery offset) assuming an average cycle efficiency for battery power that is generated from the engine. The controller may divide the efficiency of delivering power from the battery by the fuel cost plus the cost of power to charge the battery to get a battery power per dollar assessment. In one example, the controller may use the following equation:

BatteryPowerPerDollar=efficiency (in kW output per kW input)/Battery power cost (in $/kW input)*conversion constant In one example, a first fuel may cost more and a second fuel may cost less. Further, a power demand may be met by using a first amount of the first fuel or a second, smaller amount of the first fuel along with a first amount of battery power. Likewise, the power demand may be met by using a third amount of the second fuel or a fourth, smaller amount of the second fuel along with a second amount of battery power. Herein if the effective (net) cost of using the second, smaller amount of the first fuel along with a first amount of battery power is smaller than the effective cost of using the fourth, smaller amount of the second fuel along with a second amount of battery power, the value of the first fuel may be higher than that for the second fuel. Else the value of the second fuel may be higher than that for the first fuel.

At 320, the method includes determining if the cost of operating the engine with the current fuel with (or without) a battery offset if higher than the cost of operating the engine with the other fuel with (or without) a battery offset. Further, it may be determined if the difference in costs is higher than a threshold amount. With reference to the above-discussed example, the controller may determine if the cost of providing a power demand by using a first amount of the first fuel or a second, smaller amount of the first fuel along with a first amount of battery power is lower. Likewise, the controller may determine if the cost of providing the power demand by using the third amount of the second fuel or a fourth, smaller amount of the second fuel along with a second amount of battery power is lower. Then, the controller may compare the more efficient fuel and battery usage combination for each fuel to each other. In one example, the comparison may include comparing the cost of operating a first fuel with no battery power offset (which is more efficient for the first fuel at the given power level) to the cost of operating a second fuel with battery power offset (which is more efficient for the second fuel at the given power level). As such, one of the first and second fuel may be a fuel that is currently in use in the engine while the other of the first and second fuel may be the alternate available fuel.

The controller may then select between maintaining usage of the current fuel (e.g., a first fuel) and transitioning to a different fuel (e.g., a second, alternate fuel) based on the comparison. In particular, if the cost of operating the engine with the current fuel with (or without) battery offset is higher than the cost of operating the engine with the alternate fuel with (or without) battery offset, and if the difference is higher than a threshold amount, then at 324, the method includes switching to using the alternate fuel and the corresponding amount of battery offset. In addition, the battery power may be adjusted to the corresponding setting to provide the positive or negative offset, as previously determined. Further, after transitioning to the alternate fuel, the controller may adjust the speed/load schedule of the engine to provide the schedule that is optimized for the combination of the alternate fuel and battery power. For example, where the current fuel is a first fuel and the alternate fuel is a second fuel, the controller may transition to usage of the second fuel when the cost of usage of the second fuel with the battery offset is lower than the cost of usage of the first fuel with the battery power offset by more than a threshold amount. Then, in response to selecting the second fuel, the controller may operate the engine with a (second) adjusted engine speed-load profile while maintaining the power level of the vehicle using motor torque. The second adjusted engine speed-load profile may be defined for the second fuel and may correspond to a region where efficiency of the second fuel is optimized.

Also at 324, while transitioning from the current fuel to the other fuel, torque transients may be smoothed using motor torque. In this way, battery power is used to smooth out torque transients by filling in torque holes that are caused by changing fuels. This leads to additional fuel economy improvements by reducing the need for spark retard which would otherwise have been required to smooth the torque transients. The motor torque may be drawn from an energy storage system not limited to a battery. In other example, the motor torque may include one or more of electric, hydraulic, flywheel, and pneumatic motor torque.

Returning to 320, if the cost of operating the engine with the current fuel with (or without) battery offset is lower than the cost of operating the engine with the alternate fuel with (or without) battery offset, or if the cost of the current fuel is higher but the difference is lower than the threshold amount, then at 322, the method includes meeting the driver demand using engine torque with the engine operating with the current fuel. In particular, the controller maintains usage of the first fuel when the cost of usage of the second fuel with the battery offset if lower than the cost of usage of the first fuel with the battery power offset by less than the threshold amount. While maintaining usage of the first fuel, the controller may compensate for a deficit in driver demand (if any) via motor torque from an electric motor coupled to the battery. Further, in response to selecting the first fuel, the controller may operate the engine with a (first) adjusted engine speed-load profile while maintaining the power level of the vehicle using motor torque. The first adjusted engine speed-load profile may be defined for the first fuel and may correspond to a region where efficiency of the first fuel is optimized.

In one example, the first fuel is a higher octane fuel including ethanol while the second fuel is a lower octane fuel including gasoline. Herein, using the first fuel includes direct injecting the first fuel while using the second fuel includes port injecting the second fuel. In response to selecting the first fuel, the controller may operate the engine with an adjusted engine speed/load profile that includes a lower engine speed and a higher engine load. In response to selecting the second fuel, the controller may operate the engine with an adjusted engine speed/load profile that includes a higher engine speed and a lower engine load.

Figure 4:
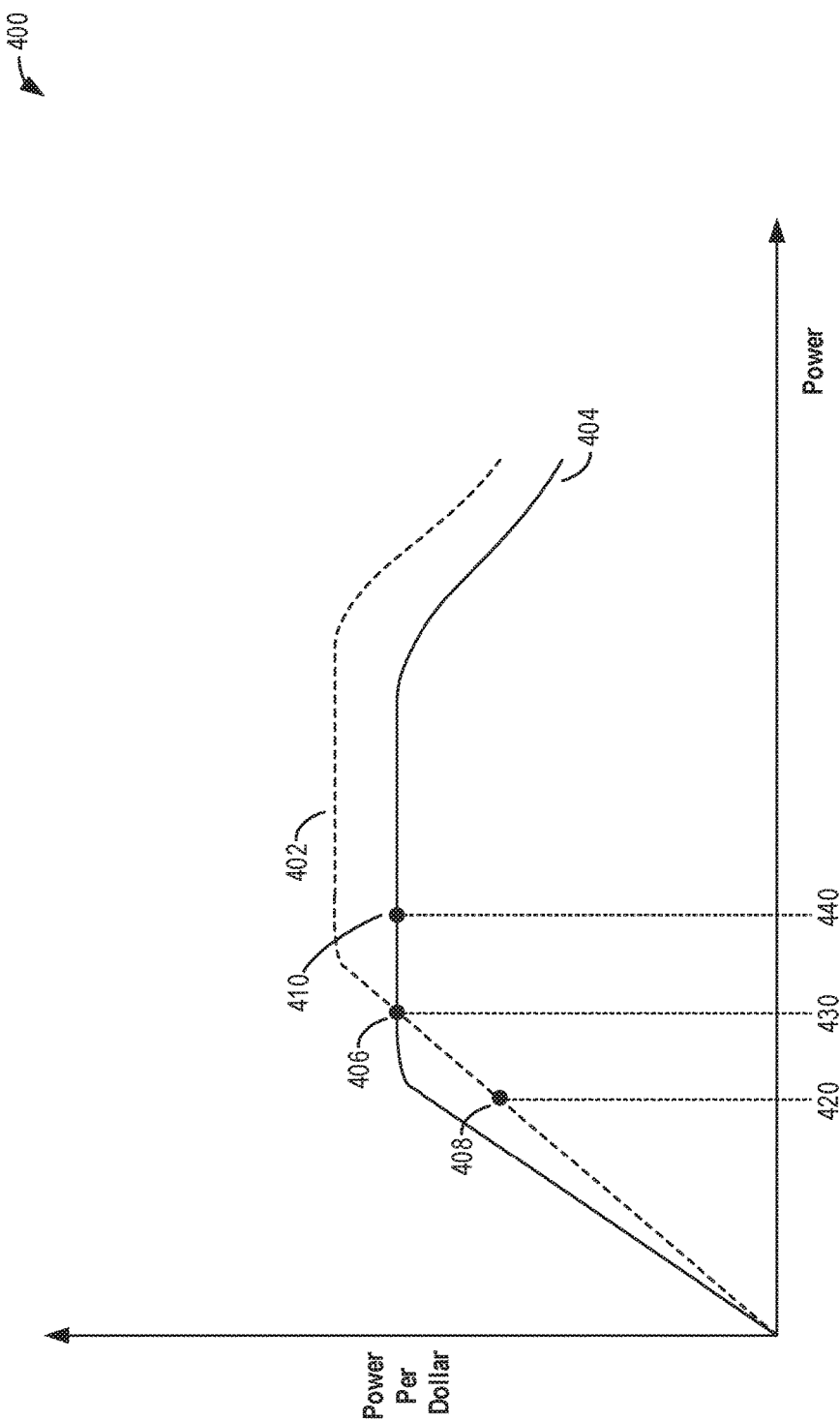
FIG. 4 shows an example map for fuel usage selection.
Figure 5:
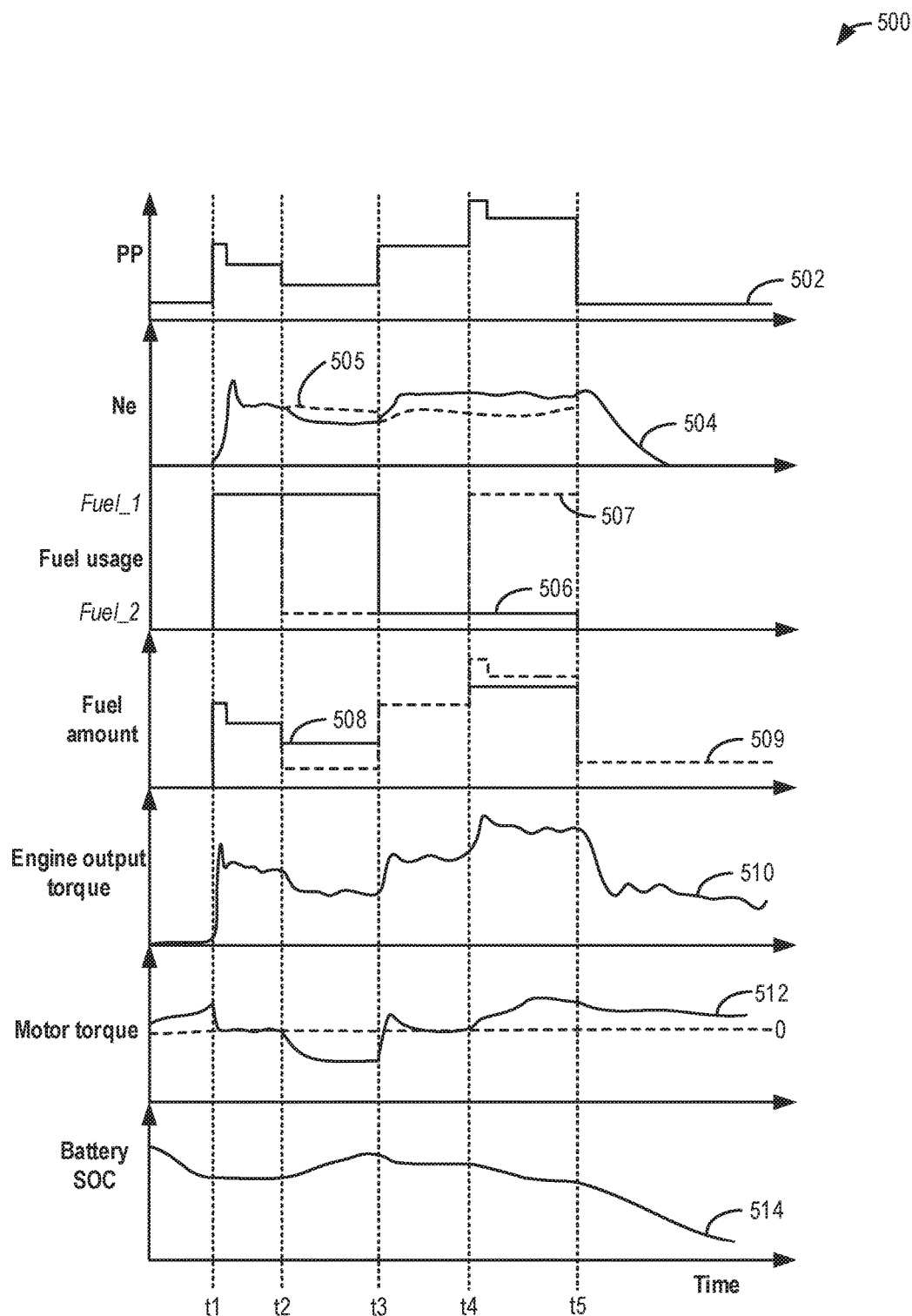
FIG. 5 shows example fuel usage adjustments during operation of a hybrid vehicle system.

In another example, the controller may reference a map, such as the example map of FIG. 4 to identify the more cost and energy efficient fuel for use in the engine as described with respect to step 312 in FIG. 3. With reference to FIG. 4, map 400 depicts a cost efficiency profile over a range of driver demand for each of a first and second fuel in a bi-fuel engine. Map 400 depicts power output along the x-axis and PowerPerDollar values for each fuel along the y-axis. Plot 402 (dashed line) depicts the cost profile for a first fuel while plot 404 (solid line) depicts the cost profile for a second fuel. As depicted, for each fuel, as power increases, the PowerPerDollar rises as efficiency rises, then PowerPerDollar plateaus, and then PowerPerDollar starts to drop as efficiency is degraded at very high power outputs. The two fuels have differing efficiency at different power levels due to differences in fuel octane, pumping work, and parasitic losses of the fuel delivery systems as described previously.

The two lines 402 and 404 intersect at operating point 406, which corresponds to power level 430. At this operating point, the efficiency and cost of operating with either fuel is equal. In one example, the engine may be using the first fuel at operating point 406. In response to a drop in driver demand, such as responsive to a change from power level 430 to power level 420, it may be more cost effective to use battery offset 412 to extend usage of the first fuel while moving engine operation to operating point 408. Herein battery offset 412 may include the battery being charged by the engine. Thus, at operating point 408, with battery offset 412, the engine may operate most efficiently and cost-effectively with the first fuel for power level 420.

In another example, the engine may be using the second fuel at operating point 406. In response to a rise in driver demand, such as responsive to a change from power level 430 to power level 440, it may be more cost effective to use battery offset 414 to extend usage of the second fuel while moving engine operation to operating point 410. Herein battery offset 414 may include the battery being discharged to provide a battery boost to the engine. Thus, at operating point 410, with battery offset 414, the engine may operate most efficiently and cost-effectively with the second fuel for power level 440.

It will be appreciated that while the present example suggests two distinct fuel possibilities for the engine, in alternate examples, the engine may be operable on multiple fuels and the controller may similarly compare costs associated with and without battery offsets for each fuel before selecting a fuel for combustion in the engine cylinder. In addition, the controller may further select a combination of fuels for combustion in the engine cylinder.

In this way, a hybrid vehicle controller may propel the vehicle via an engine using a first fuel selected based on driver demand; and in response to a change in driver demand, the controller may compare, for the change in driver demand, a first value of fuel cost to efficiency for operating with the first fuel with a first amount of battery offset to a second value of fuel cost to efficiency for operating with a second, different fuel with a second, different amount of battery offset. Following the comparison, the controller may maintain usage of the first fuel when the first value is lower than the second value; and transition to usage of the second fuel when the first value is higher than the second value. Further, the controller may select the first and second amount of battery offset based on each of a battery state of charge, an octane rating of the first and second fuel, and the change in driver demand. In one example, the change in driver demand may be a drop in driver demand, wherein during the drop in driver demand, the first amount of battery offset is larger than the second of battery offset, and usage of the first fuel is maintained responsive to the first value being lower than the second value. In another example, the change in driver demand may be a rise in driver demand, wherein during the rise in driver demand, the second amount of battery offset is larger than the first of battery offset, and usage of the second fuel is transitioned to responsive to the second value being lower than the first value. Further, while maintaining usage of the first fuel, the controller may hold the engine in a first adjusted engine speed-load profile via motor torque adjustments. In comparison, while transitioning to usage of the second fuel, the controller may hold the engine in a second adjusted engine speed-load profile via motor torque adjustments. In one example, an octane rating of the first fuel may be higher than the octane rating of the second fuel, and the first adjusted engine speed-load profile may include a lower speed and a higher load while the second adjusted engine speed-load profile includes a higher speed and a lower load. Furthermore, during the transitioning, the controller may reduce torque transients using motor torque from the battery.

Turning now to FIG. 5, example fuel usage adjustments during operation of a hybrid electric vehicle are shown at map 500. Map 500 depicts changes to an operator pedal position (PP) at plot 502, engine speed at plot 504, fuel selection (between a first fuel (Fuel_1) and a second fuel (Fuel_2) at plot 506, fuel usage amounts for each of the first fuel and second fuel at plots 508 and 509, respectively, engine torqur output at plot 510, motor torque output at plot 512, and a battery state of charge (SOC) at plot 514. All plots are shown over time (along the x-axis). Significant time-points during vehicle operation are shown at t1-t5.

Prior to t1, the hybrid vehicle is operating in an electric mode with vehicle wheels being propelled using motor torque (plot 512). In one example, vehicle operation in the electric mode is in response to a lower driver demand (plot 502). Due to the vehicle being propelled using motor torque, engine fueling is disabled (plots 506-509) and the battery SOC may be gradually decreasing (plot 514) as battery power is drawn to provide the motor torque.

At t1, in response to an increase in driver demand (such as due to a tip-in), the vehicle may be shifted to the engine mode so that engine torque can be used to propel the vehicle and meet the driver demand. In particular, based on driver demand, fuel cost, and battery state of charge, at t1, it may be most cost effective to operate with the first fuel. Accordingly, between t1 and t2, the engine operates with Fuel_1 delivered to engine cylinders. The fuel amount may be adjusted based on the driver demand. No motor torque is used at this time, as a result of which the battery SOC remains constant.

At t2, there is a small drop in driver demand but the vehicle is continued to be operated in the engine mode. In the absence of motor adjustments and battery power offsets, responsive to the change in driver demand, the engine may have needed to be shifted to Fuel_2, as indicated by dashed line 507, and operated in a different engine speed-load profile. In particular, the engine could be operated with a smaller amount of Fuel_2 as indicated by dashed line 509.

However the fuel switching may have associated power losses and engine performance issues. Instead, the controller determines that it is more efficient and cost-effective to maintain usage of Fuel_1 while operating the engine with a battery offset that results in battery charging between t2 and t3. In particular, even though a smaller amount of Fuel_2 is required, it may be overall more efficient to continue operating the engine with Fuel_1. In addition, to enhance the efficiency of Fuel_1 usage, the engine is operated with an adjusted speed-load profile optimized for Fuel_1, via adjustments to the motor torque (herein negative motor torque applied between t2 and t3, with the motor acting as a generator) and the rate of battery charging. The adjusted speed-load profile optimized for Fuel_1 may include a higher than default engine load and lower than default engine speed (compare to unadjusted engine speed profile depicted at dashed line 505). As a result, fuel economy is improved between t2 and t3 and the need for fuel switching is also obviated.

At t3, there is a further change in driver demand. At this time, it is determined that the fuel efficiency of Fuel_2 is higher and accordingly, fuel usage is switched. Between t3 and t4, the engine is operated with Fuel_2 delivered to engine cylinders. During the transition between fuels, torque transients are smoothened using motor torque, as indicated by a small drop in battery SOC at the transition followed by the plateauing of the SOC. In addition, to enhance the efficiency of Fuel_2 usage, the engine is operated with an adjusted speed-load profile optimized for Fuel_2 which includes a lower than default engine load and higher than default engine speed (compare to unadjusted engine speed profile depicted at dashed line 505).

At t4, there is a rise in driver demand but the vehicle is continued to be operated in the engine mode. In the absence of motor adjustments and battery power offsets, responsive to the change in driver demand, the engine may have needed to be shifted to Fuel_1, as indicated by dashed line 507, and operated in a different engine speed-load profile. In particular, the engine could be operated with a smaller amount of Fuel_1 as indicated by solid line 508. However the fuel switching may have associated power losses and engine performance issues. Instead, the controller determines that it is more efficient and cost-effective to maintain usage of Fuel_2 while operating the engine with a battery offset that results in battery discharging between t4 and t5. In particular, even though a smaller amount of Fuel_1 is required, it may be overall more efficient to continue operating the engine with Fuel_2. In addition, to enhance the efficiency of Fuel_2 usage, the engine is operated with an adjusted speed-load profile optimized for Fuel_2, via adjustments to the motor torque (herein positive motor torque applied between t4 and t5) and the rate of battery discharging. The adjusted speed-load profile optimized for Fuel_2 may include a lower than default engine load and higher than default engine speed (compare to unadjusted engine speed profile depicted at dashed line 505). As a result, fuel economy is improved between t4 and t5 and the need for fuel switching is also obviated.

At t5, there is a significant drop in driver demand (such as due to a tip-out). Responsive to the drop in demand, the vehicle may be shifted to the electric mode so that motor torque can be used to propel the vehicle and meet the driver demand. The engine is spun down to rest and fueling is deactivated. As a result of operating in the electric mode, the battery SOC starts to drop.

In this way, fuel economy losses in a hybrid vehicle system due to frequent engine pull-ups and pull-downs (such as on a city cycle) can be reduced. By using motor torque and battery power to provide a driver demand while maintaining a more cost-effective fuel in a more efficient operating region, frequent switching between fuels in a multi-fuel engine is reduced, even as an operator pedal position changes frequently or oscillates or overshoots. Consequently, even if engine load moves back and forth excessively between the optimum region of different fuels, fuel economy can be improved by staying in a more efficient and cost-effective fuel setting while applying a small amount of battery power charge or discharge to meet the driver demand. Overall, synergistic fuel economy benefits are achieved by leveraging the electric components of a hybrid vehicle system during fuel selection when operating a multi-fuel engine.

One example method for a hybrid vehicle comprises: propelling the vehicle via an engine combusting a first fuel and a second fuel selected based on driver demand; and in response to a change in driver demand, adjusting relative usage of the first fuel and the second fuel based on each of the change in driver demand and a state of charge of an energy storage system. In the preceding example, additionally or optionally, the adjusting may include selecting between maintaining usage of the first fuel and transitioning to the second fuel, the selecting further based on a cost of usage of the first fuel relative to a cost of usage of the second fuel. In any or all of the preceding examples, additionally or optionally, the selecting based on the state of charge includes the selecting based on a cost of usage of each of the first and second fuel with a stored power offset based on the state of charge. In any or all of the preceding examples, additionally or optionally, the stored power offset applied with usage of the first fuel is different from the stored power offset applied with usage of the second fuel. In any or all of the preceding examples, additionally or optionally, the stored power offset includes one of an increase in the state of charge via charging of an energy storage system using engine torque, and decrease in the state of charge via discharging of the stored power to supplement the engine torque. In any or all of the preceding examples, additionally or optionally, the selecting includes transitioning to usage of the second fuel when the cost of usage of the second fuel with the stored power offset is lower than the cost of usage of the first fuel with the stored power offset by more than a threshold amount. In any or all of the preceding examples, additionally or optionally, the selecting further includes maintaining usage of the first fuel when the cost of usage of the second fuel with the stored power offset is lower than the cost of usage of the first fuel with the stored power offset by less than a threshold amount. In any or all of the preceding examples, additionally or optionally, the method further comprises when maintaining usage of the first fuel, compensating for a deficit in the driver demand via torque from a motor coupled to the energy storage system. In any or all of the preceding examples, additionally or optionally, the method further comprises, in response to selecting the first fuel, operating the engine with a first adjusted speed-load profile while maintaining a power level of the vehicle using motor torque, and in response to selecting the second fuel, operating the engine with a second adjusted speed-load profile while maintaining the power level of the vehicle using motor torque. In any or all of the preceding examples, additionally or optionally, the first fuel is a high octane fuel including ethanol, and wherein the second fuel is a low octane fuel including gasoline. In any or all of the preceding examples, additionally or optionally, the first fuel is a gaseous fuel including compressed natural gas, and wherein the second fuel is a liquid fuel including at least gasoline. In any or all of the preceding examples, additionally or optionally, using the first fuel in the engine includes direct injecting the first fuel and wherein using the second fuel in the engine includes port injecting the second fuel.

Another example method for a hybrid vehicle comprises: propelling the vehicle via an engine using a first fuel selected based on driver demand; and in response to a change in driver demand, comparing, for the change in driver demand, a first value of fuel cost for operating with the first fuel with a first amount of stored power offset to a second value of fuel cost for operating with a second, different fuel with a second, different amount of stored power offset; and maintaining usage of the first fuel when the first value is lower than the second value; and transitioning to usage of the second fuel when the first value is higher than the second value to deliver the changed driver demand. In the preceding example, additionally or optionally, the method further comprises selecting the first and second amount of stored power offset based on each of a state of charge of an energy storage system, an octane rating of the first and second fuel, a cost of the first and second fuel, and the change in driver demand. In any or all of the preceding examples, additionally or optionally, the change in driver demand is a drop in driver demand, and wherein during the drop in driver demand, the first amount of stored power offset is larger than the second amount of stored power offset, and usage of the first fuel is maintained responsive to the first value being lower than the second value. In any or all of the preceding examples, additionally or optionally, the change in driver demand is a rise in driver demand, and wherein during the rise in driver demand, the second amount of stored power offset is larger than the first of stored power offset, and usage of the second fuel is transitioned to responsive to the second value being lower than the first value. In any or all of the preceding examples, additionally or optionally, the method further comprises, while maintaining usage of the first fuel, holding the engine in a first adjusted engine speed-load profile via motor torque adjustments, and while transitioning to usage of the second fuel, holding the engine in a second adjusted engine speed-load profile via motor torque adjustments, wherein an octane rating of the first fuel is higher than the octane rating of the second fuel, and wherein the first adjusted engine speed-load profile includes a lower speed and a higher load while the second adjusted engine speed-load profile includes a higher speed and a lower load. In any or all of the preceding examples, additionally or optionally, the method further comprises, during the transitioning, reducing torque transients using motor torque from the energy storage system, the energy storage system including a battery.

Another example hybrid vehicle system comprises: a motor powered via an energy storage system; an internal combustion engine including a cylinder; a first fuel injector for injecting a first fuel into the cylinder; a second fuel injector for injecting a second fuel into the cylinder; vehicle wheels propelled via one or more of motor torque and engine torque; a pedal position sensor for receiving an operator torque demand; and a controller. The controller may be configured with computer-readable instructions stored on non-transitory memory for: responsive to a first change in operator torque demand, maintaining injection of the first fuel while changing a state of charge of the energy storage system by a first amount to meet the torque demand; and responsive to a second, different change in operator torque demand, shifting to injection of the second fuel while changing the state of charge of the energy storage system by a second, different amount to meet the torque demand. In the preceding example, additionally or optionally, the first change in operator torque demand is a decrease in demand and changing the state of charge of the energy storage system by a first amount includes charging the energy storage system, and wherein the second change in operator torque demand is an increase in demand and changing the state of charge of the energy storage system by a second amount includes discharging the energy storage system. In any or all of the preceding examples, additionally or optionally, the controller includes further instructions for: while maintaining injection of the first fuel, operating the engine in a first engine speed-load profile while maintaining a power level; and while shifting to injection of the second fuel, operating the engine in a second engine speed-load profile while maintaining the power level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
propelling the vehicle via an engine combusting a first fuel and a second, different fuel selected based on driver demand; and
in response to a change in driver demand, adjusting relative usage of the first fuel and the second fuel based on each of the change in driver demand and a state of charge of an energy storage system via selecting between maintaining usage of the first fuel and transitioning to the second fuel based on a cost usage of the first fuel relative to a cost usage of the second fuel, and where the adjusting is further based on the cost usage of each of the first fuel and the second fuel with a stored power offset based on the state of charge.

2. The method of claim 1, wherein the stored power offset applied with usage of the first fuel is different from the stored power offset applied with usage of the second fuel.

3. The method of claim 1, wherein the stored power offset includes one of an increase in the state of charge via charging of the energy storage system using engine torque, and a decrease in the state of charge via discharging of stored power to supplement the engine torque.

4. The method of claim 1, wherein the selecting further includes transitioning to usage of the second fuel when the cost of usage of the second fuel with the stored power offset is lower than the cost of usage of the first fuel with the stored power offset by more than a threshold amount.

5. The method of claim 4, wherein the selecting further includes maintaining usage of the first fuel when the cost of usage of the second fuel with the stored power offset is lower than the cost of usage of the first fuel with the stored power offset by less than a threshold amount.

6. The method of claim 1, further comprising, when maintaining usage of the first fuel, compensating for a deficit in the driver demand via torque from a motor coupled to the energy storage system.

7. The method of claim 1, further comprising, in response to selecting the first fuel, operating the engine with a first adjusted speed-load profile while maintaining a power level of the vehicle using motor torque, and in response to selecting the second fuel, operating the engine with a second adjusted speed-load profile while maintaining the power level of the vehicle using motor torque.

8. The method of claim 1, wherein the first fuel is a high octane fuel including ethanol, and wherein the second fuel is a low octane fuel including gasoline.

9. The method of claim 1, wherein the first fuel is a gaseous fuel including compressed natural gas, and wherein the second fuel is a liquid fuel including at least gasoline.

10. The method of claim 9, wherein using the first fuel in the engine includes direct injecting the first fuel and wherein using the second fuel in the engine includes port injecting the second fuel.

11. A method for a hybrid vehicle, comprising:
propelling the vehicle via an engine using a first fuel selected based on driver demand; and
in response to a change in driver demand,
comparing, for the change in driver demand, a first value of fuel cost for operating with the first fuel with a first amount of stored power offset to a second value of fuel cost for operating with a second, different fuel with a second, different amount of stored power offset; and
maintaining usage of the first fuel when the first value is lower than the second value; and
transitioning to usage of the second fuel when the first value is higher than the second value to deliver the changed driver demand.

12. The method of claim 11, further comprising selecting the first and second amounts of stored power offset based on each of a state of charge of an energy storage system, an octane rating of the first and second fuels, a cost of the first and second fuels, and the change in driver demand.

13. The method of claim 11, wherein the change in driver demand is a drop in driver demand, and wherein during the drop in driver demand, the first amount of stored power offset is larger than the second amount of stored power offset, and usage of the first fuel is maintained responsive to the first value being lower than the second value.

14. The method of claim 11, wherein the change in driver demand is a rise in driver demand, and wherein during the rise in driver demand, the second amount of stored power offset is larger than the first amount of stored power offset, and usage of the second fuel is transitioned to responsive to the second value being lower than the first value.

15. The method of claim 11, further comprising, while maintaining usage of the first fuel, holding the engine in a first adjusted engine speed-load profile via motor torque adjustments, and while transitioning to usage of the second fuel, holding the engine in a second adjusted engine speed-load profile via motor torque adjustments, wherein an octane rating of the first fuel is higher than an octane rating of the second fuel, and wherein the first adjusted engine speed-load profile includes a lower speed and a higher load while the second adjusted engine speed-load profile includes a higher speed and a lower load.

16. A hybrid vehicle system, comprising:
a motor powered via an energy storage system;
an internal combustion engine including a cylinder;
a first fuel injector for injecting a first fuel into the cylinder;
a second fuel injector for injecting a second fuel into the cylinder;
vehicle wheels propelled via one or more of motor torque and engine torque;
a pedal position sensor for receiving an operator torque demand; and
a controller with computer-readable instructions stored on non-transitory memory for:
responsive to a first change in operator torque demand, comparing each of a first value of fuel cost for operating with the first fuel with a first amount of stored power offset to a second value of fuel cost for operating with the second fuel with a second amount of stored power offset and maintaining injection of the first fuel while changing a state of charge of the energy storage system by a first amount to meet the first change in operator torque demand, where the first value is lower than the second value; and
responsive to a second, different change in operator torque demand, comparing each of a third value of fuel cost for operating with the first fuel with a third amount of stored power offset to a fourth value of fuel cost for operating with the second fuel with a fourth amount of stored power offset and shifting to injection of the second fuel while changing the state of charge of the energy storage system by a second, different amount to meet the second change in operator torque demand, where the third value is greater than the fourth value.

17. The system of claim 16, wherein the first change in operator torque demand is a decrease in demand and changing the state of charge of the energy storage system by the first amount includes charging the energy storage system, and wherein the second change in operator torque demand is an increase in demand and changing the state of charge of the energy storage system by the second amount includes discharging the energy storage system.

18. The system of claim 16, wherein the controller includes further instructions for:
   while maintaining injection of the first fuel, operating the engine in a first engine speed-load profile while maintaining a power level; and
   while shifting to injection of the second fuel, operating the engine in a second engine speed-load profile while maintaining the power level.

* * * * *